US005324374A

United States Patent [19]
Harmand et al.

[11] Patent Number: 5,324,374
[45] Date of Patent: Jun. 28, 1994

[54] LAMINATED GLASS WITH AN ELECTROCONDUCTIVE LAYER

[75] Inventors: Helene Harmand, Paris; Jean-Francois Oudard, Vincennes; Dominique Bruneel, Paris, all of France

[73] Assignee: Saint Gobain Vitrage, Courbevoie, France

[21] Appl. No.: 956,543

[22] Filed: Oct. 2, 1992

Related U.S. Application Data

[63] Continuation of Ser. No. 723,739, Jun. 21, 1991, abandoned, which is a continuation of Ser. No. 383,522, Jul. 24, 1989, abandoned.

[30] Foreign Application Priority Data

Jul. 27, 1988 [FR] France .................... 88 10139

[51] Int. Cl.$^5$ ........................................... B32B 17/10
[52] U.S. Cl. ................... 156/102; 156/100; 156/106; 65/60.51; 65/60.53; 219/203; 427/108; 427/126.2; 427/163; 427/165
[58] Field of Search ............... 156/99, 100, 102, 104, 156/106; 65/60.1, 60.5, 60.51, 60.53; 219/203, 522; 427/108, 126.2, 163, 165

[56] References Cited

U.S. PATENT DOCUMENTS

| | | | |
|---|---|---|---|
| 2,648,754 | 8/1953 | Lytle | 428/433 |
| 3,974,359 | 8/1976 | Orcutt et al. | 219/522 |
| 4,057,671 | 11/1977 | Shoop | 428/208 |
| 4,073,986 | 2/1978 | Keslar et al. | 428/38 |
| 4,078,107 | 3/1978 | Bitterice et al. | 156/99 X |
| 4,278,875 | 7/1981 | Bain | 219/203 X |
| 4,490,227 | 12/1984 | Bitter | 428/432 |
| 4,583,815 | 4/1986 | Taga et al. | 350/1.6 |
| 4,644,139 | 2/1987 | Harrison et al. | 219/522 |
| 4,654,067 | 3/1987 | Ramus et al. | 65/60.51 |
| 4,655,811 | 4/1987 | Bitter | 65/60.51 |
| 4,744,844 | 5/1988 | Hurst | 219/203 X |
| 4,859,499 | 8/1989 | Sauvinet et al. | 65/60.52 X |

FOREIGN PATENT DOCUMENTS 0108616 5/1984 European Pat. Off. .
0274914 7/1988 European Pat. Off. .

OTHER PUBLICATIONS

"Intro to Mat'ls Science for Engrs", James F. Shackelford, Macmillan Pub. Co., 1985, pp. 341-342.

Primary Examiner—Michael W. Ball
Assistant Examiner—Francis J. Lorin
Attorney, Agent, or Firm—Oblon, Spivak, McClelland, Maier & Neustadt

[57] ABSTRACT

A laminated glazing is prepared by a providing an electroconductive layer on side 3, the sides of such a glazing being conventionally numbered from 1-4 starting from the outside of the glazing when mounted on a vehicle, towards the inside. The electroconductive layer is formed by powder deposition and pyrolysis to form a ITO layer on a glass pane, which is subsequently bent such that the surface bearing the ITO layer is convex. This glass is laminated with a glass of the same curvature, between which panes is sandwiched a plastic interlayer. On the side of the interlayer facing the electroconductive layer, current lead strips, in the form of metal tinsel, are provided, such that upon lamination, the metal lead strips are in electrical contact with the electroconductive layer and lead to a source of electricity. The resulting window is produced more simply, more reliably, and exhibits improved defogging.

6 Claims, 1 Drawing Sheet

LAMINATED GLASS WITH AN ELECTROCONDUCTIVE LAYER

This application is a continuation of application Ser. No. 07/723,739, filed on Jun. 21, 1991, now abandoned, which is a continuation of abandoned application Ser. No. 07/383,522 filed Jul. 24, 1989, now abandoned.

BACKGROUND OF THE INVENTION

1. Field of the Invention

This invention pertains to a laminated glass with an electroconductive layer for automobiles or vehicles in general and more particularly windshields.

2. Background of the Prior Art

Glazings, generally made of two glass sheets combined with a transparent plastic interlayer of the polyvinylbutyral (PVB) type are well known. However, the electroconductive layer is almost always set on the internal side of the outer glass sheet, i.e. side 2, the sides of a bilayered laminated glass being conventionally numbered 1,2,3,4, starting from the outside of the glazing, that is to say the outside part when this glazing is mounted in a frame enclosing a vehicle, towards the inside.

Thus, the patent document EP 108616 of Donnelly Mirrors proposes a laminated glazing with two combined glass sheets having on side 2 an electroconductive layer of tin indium oxide (ITO) deposited by a vacuum technique.

The patent document U.S. Pat. No. 4,654,067 of Ford also proposes a similar type of windshield with the electroconductive layer located on side 2.

The same choice of side 2 is made in U.S. Pat. No. 2,944,296.

Other patent documents confirm the recurring choice of side 2 as a support for the electroconductive layer.

However, the patent document EP 192009 proposes to set the electroconductive layer, an ITO layer, on an outside part of the laminated glazing, i.e. side 1 or 4, in order to enable the thermal reduction treatment of the layer with a burner flame, a burner which would heat the ITO layer only, and not the glass and/or the PVB interlayer.

Apart from the last example, the recurring positioning of the layer on side 2 may be justified by the necessity to bend the glass after it has been coated. Moreover, in order to minimize the cracks and more generally the deterioration of the layer during the bending process, it should preferably be located on the concave rather than convex side of the glass. Otherwise, the layer would be put under extension, therefore increasing its risks of deterioration.

As an additional reason for selection of the recurring choice of side 2 for the electroconductive layer, one can point to the fact that it is extremely difficult to set a homogeneous layer by means of cathodic pulverization, with a plane cathode on a convex shape where the sides are in "shadow", rather than on a concave side, since side 2 on a windshield and a car in general is usually concave.

Moreover, in order to explain the recurring choice of side 2 for the electroconductive layer, one may have sought to facilitate the defrosting of a windshield by setting the said heating layer as close as possible to the surface to be defrosted.

However, if defrosting can be improved by positioning of the layer on side 2, this is not the case for defogging which is connected with side 4. Whereas defrosting only takes place at the starting of the car, standstill, or for a short period of time of about 3 min, and this only during certain days in wintertime, defogging is necessary all year long and most frequently when the car is running. As a consequence, defogging is not a minor function that can be overlooked. Furthermore, the defogging of a windshield internal side is generally difficult since the heating layer is located further away from the internal side to be defogged. This operation becomes even more difficult since the heating effects of the layer are decreased by the air streams on the windshield, i.e. the convective exchanges on the outside of the windshield increasing with the speed of the car.

Therefore defogging is very inefficient, if present at all when the vehicle is running and when the heating layer of the windshield is located on side 2. Even with a nonfogging windshield having a heating layer on side 2, additional means of defogging by air blowing (possibly not) have to be installed, which are both expensive and uncomfortable.

Furthermore, in case of breakage of the windshield by a stone, most of the time, only the external glass sheet of the windshield is damaged. Therefore, the conductive layer will also be damaged if located on side 2, that is to say the internal side of the broken glass sheet. The repairing of the windshield without dismantling, and be simply filling up the crack of the outside glass with a material similar to the glass index, will not repair the conductive layer. Most of the time, the deteriorated layer will still conduct electricity, but only in restricted areas and with a stronger intensity in these particular areas. This will lead to localized superheatings that may destroy the PVB plastic interlayer of the laminated glazing, making it non transparent locally and creating vision-disturbing defects incompatible with security.

SUMMARY OF THE INVENTION

This invention aims at supplying glazings with an electroconductive layer for vehicles and more particularly laminated windshields, that is to say with two sheets of glass that are combined by a thermoplastic transparent interlayer of PVB type. such glazings do not have the same drawbacks as traditional laminated windshields: faster defogging, possibly repairable when only the outside glass sheet is cracked without causing any vision-disturbing defects and without questioning security in case of breakage.

For this purpose, this invention comprises a laminated glazing in which the electroconductive layer is located on side 3. As already mentioned, the sides of the laminated glass sheets are numbered from 1 to 4 starting from the outside of the vehicle, when enclosed by the glazing, towards the inside.

Advantageously, this layer is manufactured by a pyrolysis technique, reinforcing its solidity and making its bending possible even with a convex side.

Advantageously, this layer is made up of indium tin oxide (ITO) obtained by pyrolysis of powder compounds.

BRIEF DESCRIPTION OF THE FIGURE

This invention shall be described in greater details hereafter referring to the enclosed drawing which represents an exploded view of a bilayered laminated glass with an electroconductive layer in accordance with the invention.

DETAILED DESCRIPTION OF THE INVENTION

Figure 1:
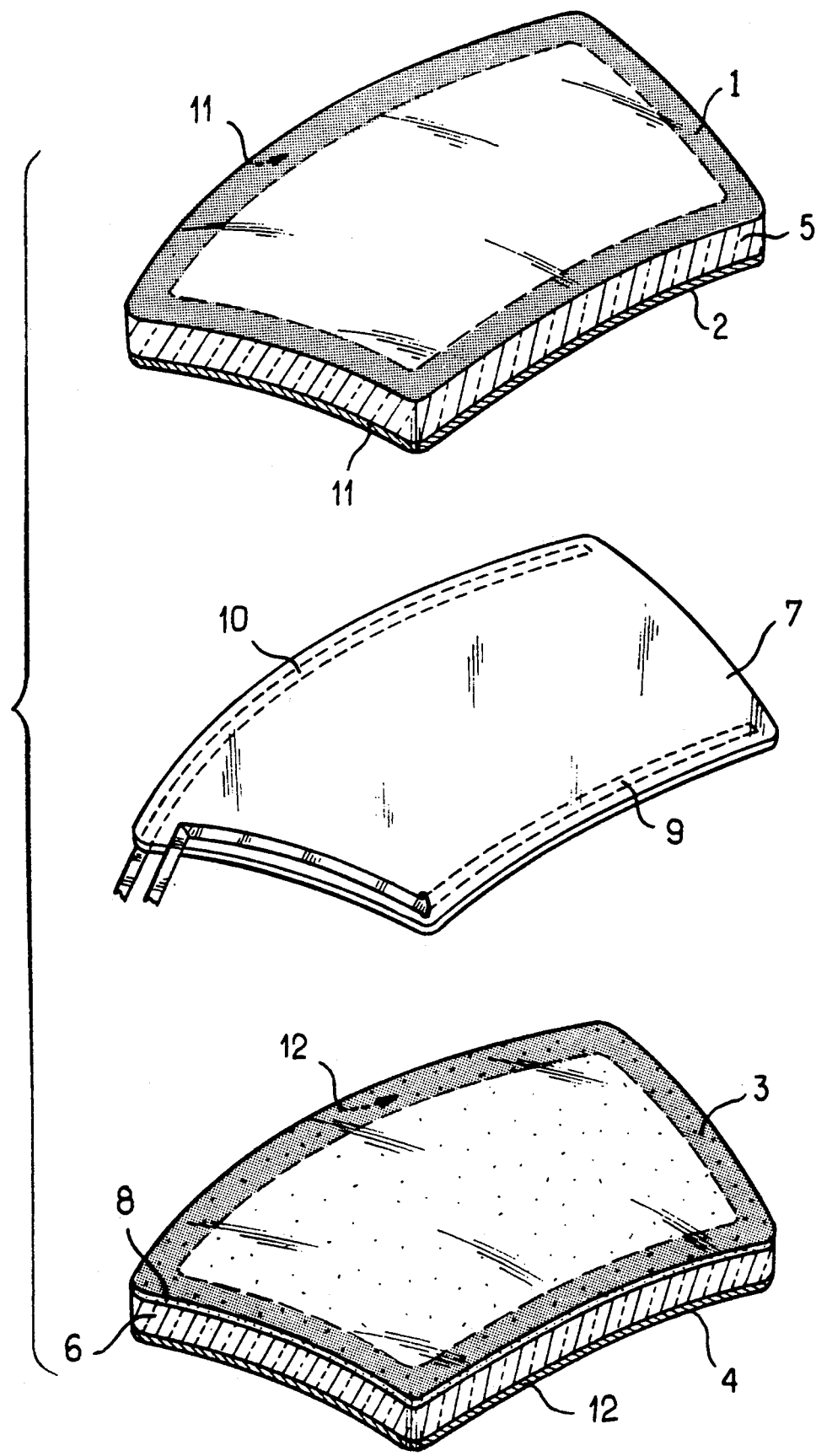

The glazing described on the enclosed figure is made up of two glass sheets 5 and 6, assembled by lamination thanks to a transparent thermoplastic interlayer 7 of PVB type (polyvinyl butyral), polyurethane (PU), polyvinylchloride (PVC), etc., adhering to both glass sheets.

Such a vehicle glazing is generally bent. It is especially true for a windshield since, most of the time, its outside part, i.e. the part outside the vehicle enclosed by the said glazing, is convex.

However, as far as other glazings for vehicles are concerned, especially rear windows, the outside part may also be concave.

This invention applies to the two types of curvature and more generally to all types of laminated glazings for vehicles, that exhibit a curvature. However, the drawing only describes a windshield type glazing with a convexity turned towards the outside.

As already mentioned, the four sides of the two glass sheets 5 and 6 are numbered 1,2,3,4, starting from the outside towards the inside. Sides 2 and 3 are therefore in contact with sheet 7, of PVB for example.

This glazing in accordance with the invention comprises an electroconductive layer 8 on side 3, positioned on glass sheet 6 before the laminating process. It is a metallic layer (this expression also includes the layers based on metallic oxide(s), for example tin oxide ($SnO_2$), tin indium oxide (ITO), etc..., and also the type resulting from the laminating of films having among them a metallic film (for example laminating of $SnO_2/Ag/SnO_2$).

This layer is formed by means of conventional techniques: pyrolysis from powder compounds, solutions or suspensions, steams, vacuum deposits (cathodic pulverization, magnetron, plasma, etc...) process by tempering, etc.

Layer 8 positioned on side 3 offers the already mentioned advantages: improved defogging, protection of the layer and maintenance of vision despite the breakage of the outside glass sheet 5, possibility to repair the windshields when only the outside glass is cracked.

Advantageously, when the glazing is bent, even sharply bent, the invention proposes —especially when bending is carried out after the positioning of layer 8— a pyrolysed layer, that is to say a layer obtained by decomposition under the effect of the substrate high heat, followed by oxidation, of organo-metallic compounds, and especially powder compounds.

As a matter of fact, the layers deposited and formed on a hot substrate appear to be more solid and especially more likely than others to be bent without any damage. Among these pyrolyzed layers, those obtained from powder compounds are exceptionally solid and can be outstandingly well bent with minimum precaution.

Among these layers being pyrolysed from powders, exemplary compositions include the layers based on $SnO_2$ which are obtained for example from DBTF (dibutyl tin fluoride) as described in the patent documents EP 39256, EP 125153. One may also refer to the layers based on indium tin oxide (ITO) obtained for example from indium formate and a tin compound, especially DBTO (dibutyl tin oxide). These ITO layers are described in the already-mentioned patents EP 192009 and FR 8800131.

This invention is particularly interesting for windshields or glazings coated with an ITO layer 8 on side 3, with a minimum thickness of about 180 nm. This invention may be advantageously used for a layer, colored in accordance with the customers' taste. With a 180 nm thickness, the ITO layer has a resistance per square of about 10 ohms, a practically neutral transmission color, and a slightly bluish reflection color.

Advantageously, at least one of the two glass sheets 5 and 6 is tinted in its mass, for example sheet 5, exempt from layer 8, is preferably of greenish color, and with antisolar properties improving the comfort in summer time of the vehicles equipped with such glasses. It is well known that the green color is a preferred color for automotive windows, and the association of an about 180 nm thick layer 8 with a greenish tinted glass gives a satisfactory greenish overall aspect. The green glass sheet may be of type of said colored "TSA" or "TSA2+", i.e. a classical silicon-sodium-calcium-based glass, colored up by metallic iron oxides and cobalt. These are introduced in accordance with weight proportions close to:

| | |
|---|---|
| for "TSA" | $Fe_2O_3$ between 0.55 and 0.62% |
| | FeO between 0.11 and 0.16% |
| | CoO inferior to 12 ppm and even inferior to 10 ppm |
| for "TSA$^2$ +" | $Fe_2O_3$ between 0.75 and 0.90% |
| | FeO between 0.15 and 0.22% |
| | CoO inferior to 17 ppm and even preferably 10 ppm. |

Another satisfactory color, green, can also be obtained with a thickness for layer 8 of about 350–380 nm. With such a thickness, the layer itself is of greenish color in reflection; its resistance per square is on the order of 4.5 ohms, which makes its use possible on vehicles and especially automobiles. When the laminated glass comprises a green colored glass sheet 5 and/or 6 of "TSA" or "TSA2+" type, the green color is of course uniform for the whole laminated glass.

Most of the time, glazings and more particularly laminated glazings with layer 8 for vehicles, are now bent. Usually, the bending is such that the outside of the glazing is convex. Therefore, layer 8 on side 3 is also on a convex surface. When layer 8 is not a pyrolyzed layer, it may also be positioned onto a convex side despite its lesser resistance and lesser adaptability to bending in comparison to a pyrolyzed layer. However, it is then very important to either take precautions during the bending process when the layer is extended, or to position layer 8 after the glass bending process.

As far as a pyrolyzed layer is concerned, especially when made from powder compounds such as the ITO layer described in the already-mentioned patents EP 192009 and FR 2635754, of which U.S. Pat. No. 5,104,498, herein incorporated by reference, is equivalent thereto, the bending of a glass that has already been coated with its layer is no problem.

The precautions to be taken in order to bend a "fragile" layer 8 are for example mentioned in patent documents EP 108616 of which U.S. Pat. No. 5,011,585, herein incorporated by reference, is equivalent thereto, and FR 8809284.

With such precautions for the most fragile layers 8, and without any particular precaution for the pyrolyzed layers 8, especially those obtained from powder compounds, layers after bending can be homogeneous with a homogeneous electrical resistance on their entire surface, whatever the curvature direction, as long as they are homogeneously positioned so as to obtain the same characteristics on the entire surface, on the entire glazing surface, at least in the area within the electrical current leading strips.

Of course, layers that are non-homogeneous on the entire glazing surface, or not positioned on the entire glazing surface are also possible, and are part of the invention when located on side 3.

This invention especially proposes laminated glazings with an ITO layer positioned on side 3, on glass sheet 6 in silicon-sodium-calcium clear glass, of a thickness in the region of 1.5 to 3 mm. The ITO layer should preferably be obtained by pyrolyzing powders, with a thickness either in the order of 180 nm., or in the region of 350 to 380 mm. The other glass sheet 5 is a "TSA" type tinted glass, of green color for example, with a thickness ranging between 1.5 to 3 mm, but preferably between 2 to 2.6 mm.

Thicknesses of clear and/or tinted glass lesser than the above-mentioned thicknesses are also possible.

Regarding the above-mentioned thicknesses, the light transmission T1 is above 75% or 70% required by the regulations for automobiles glazings. Moreover, energetic transmission is decreased.

Of course, as is usually the case, electrical current leading strips 9 and 10 are planned in order to supply the layer with electricity. These may be Ag printed strips positioned onto layer 8 itself, preferably to supply its entire surface in an homogeneous way, and which are horizontally set at the top and the lower part of the windshield, so that the distance between the electrical current leading strips is smaller than if positioned the other way.

As a variant, these electrical current leading strips 9 and 10 are metallic tinsels that are fixed onto the PVB sheet, by soldering for example, and are then plated on layer 8 at the same time as the PVB during the laminating process.

These are for example tin-plated copper tinsels, that are about 5 to 10 mm wide and a tenth of millimeter thick.

Of course, enamel deposits 11 and 12 are also planned at the periphery of the glazing in order to mask, both from the inside and the outside, the electrical current leading strips 9 and 10 and also to protect the glue used to fix the windshield in its frame against sun degradation.

These deposits are generally made at the made at the periphery of sides 4 and 2 before the bending and laminating process. The use of metallic tinsels in order to lead the electrical current avoids the difficulties of transportation, and handling in general, during the manufacturing process of a glass sheet 6 which would carry on one side an enamel deposit 12 and on the other side printed strips 9 and 10, the deposit 12 and the strips 9 and 10 being fragile before firing.

In the case of printed current leading strips, it is therefore essential to be very careful during handling and/or to separately make or fire the strips and the deposits that are positioned on the different sides of a same sheet.

In this way, the laminating glazing in accordance with the present invention with the electroconductive layer on side 3 works much better than a glazing with a layer on side 2 as far as defogging is concerned; it makes it possible to repair a windshield when only the outside glass sheet is cracked; defogging is also more efficient.

Moreover, the positioning of the electroconductive layer on side 3 makes it possible to obtain a better looking glazing than when the layer is on side 2. As a matter of fact, with the layer on side 2, the peripheral enamel deposit on glass sheet 5 is made on the layer itself so that on its edges, the said layer can be seen from the outside on a generally black enamel background. As a consequence, its color—greenish for example—shows more on the edges. The aesthetics of such glazing is not as good with such different shades. Furthermore, on top of the above-mentioned drawbacks, the printed current leading strips cannot be completely masked when the layer is positioned on side 2. Due to adhesion reasons, the enamel deposits and the current leading strips can not accurately overlap. On the contrary, they must slightly extend over each other in order to cling to one another, at least on part of their width, on the electroconductive layer. Therefore, the current leading strips can be partially seen.

Since the layer can fulfill the two defogging and defrosting functions, such a windshield makes it possible to suppress the classical means of defogging by air-blowing, which is both expensive to install and uncomfortable to use.

Of course, whether the electroconductive layer is on side 2 or 3, other functions that were not mentioned above can also be fulfilled, such as antenna function, I.R. reception function, alarm function, etc.

The present invention proposed specific thicknesses for the ITO layer of about 180 nm. and 350-380 nm. These thicknesses help obtain colors which are desired by automotive customers, but also make satisfactory heatings possible. However, the positioning on side 3 of layers other than ITO and/or different thicknesses are of course feasible and in the field of the invention. Although the colors will be different, all the advantages resulting from the positioning on side 3 will remain.

The above invention has been described with regard to specific embodiments and generalized disclosure. No embodiments are limiting unless specifically so disclosed. Other departures from the specific disclosure will occur to those of skill in the art without the exercise of inventive faculty, and remain within the scope of the invention, as set forth in the claims appended hereto.

What is claimed is:

1. A method of forming a laminated glazing, which comprises:

forming an electroconductive indium tin oxide (ITO) layer by pyrolysis of a mixture of powdered indium and tin compounds on a side of a first glass sheet which is to serve as side three of said laminated glazing formed of two glass sheets and having sides 1, 2, 3 and 4 starting from the outside toward the inside of a vehicle in which the glazing is to be mounted;

reducing the electroconductive ITO layer;

applying a layer of enamel along the peripheries of sides 4 and 2 of said glass sheets;

bending each of the two glass sheets into a shape desired for mounting on said vehicle such that side 3 of said first glass sheet is bent into a convex shape;

contacting the second of said two glass sheets with said first glass sheet having said electroconductive layer thereon so that said electroconductive layer is between said glass sheets and positioning a thermoplastic sheet having electrical current leading strips fixed thereon such that upon lamination in the next step, the leading strips come into contact with said electroconductive layer on the edges of said first glass sheet, between said glass sheets; and laminating the combined glass sheets under heat and pressure to prepare a glazing for said vehicle.

2. The method of claim 1, wherein the pyrolized layer, upon bending of the laminated glass sheet has a homogenous thickness over the entire surface thereby exhibiting a homogenous electrical resistance over its entire surface.

3. The method of claim 1, wherein said electrical current leading strips are positioned on said electroconductive layer prior to lamination of the glass sheets.

4. The method of claim 1, which comprises applying the electroconductive layer of indium-tin oxide to a minimum thickness of about 180 nm on said glass sheet.

5. The method of claim 1, wherein said mixture of indium and tin compounds is a mixture of indium formate and dibutyl tin oxide.

6. The method of claim 1, wherein said second glass sheet is tinted to a greenish color by cobalt oxide, iron oxide or combinations thereof.

* * * * *